UNITED STATES PATENT OFFICE.

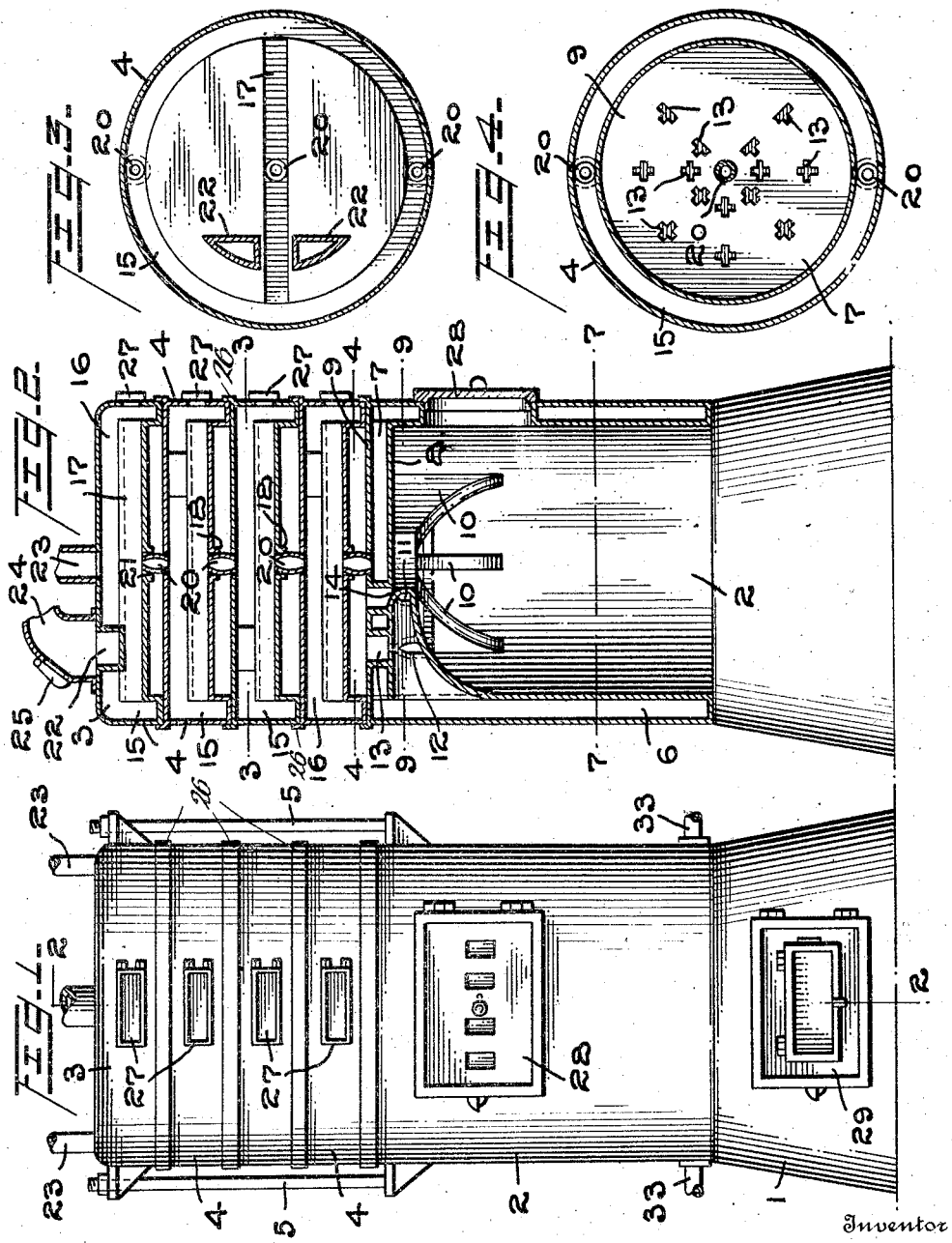

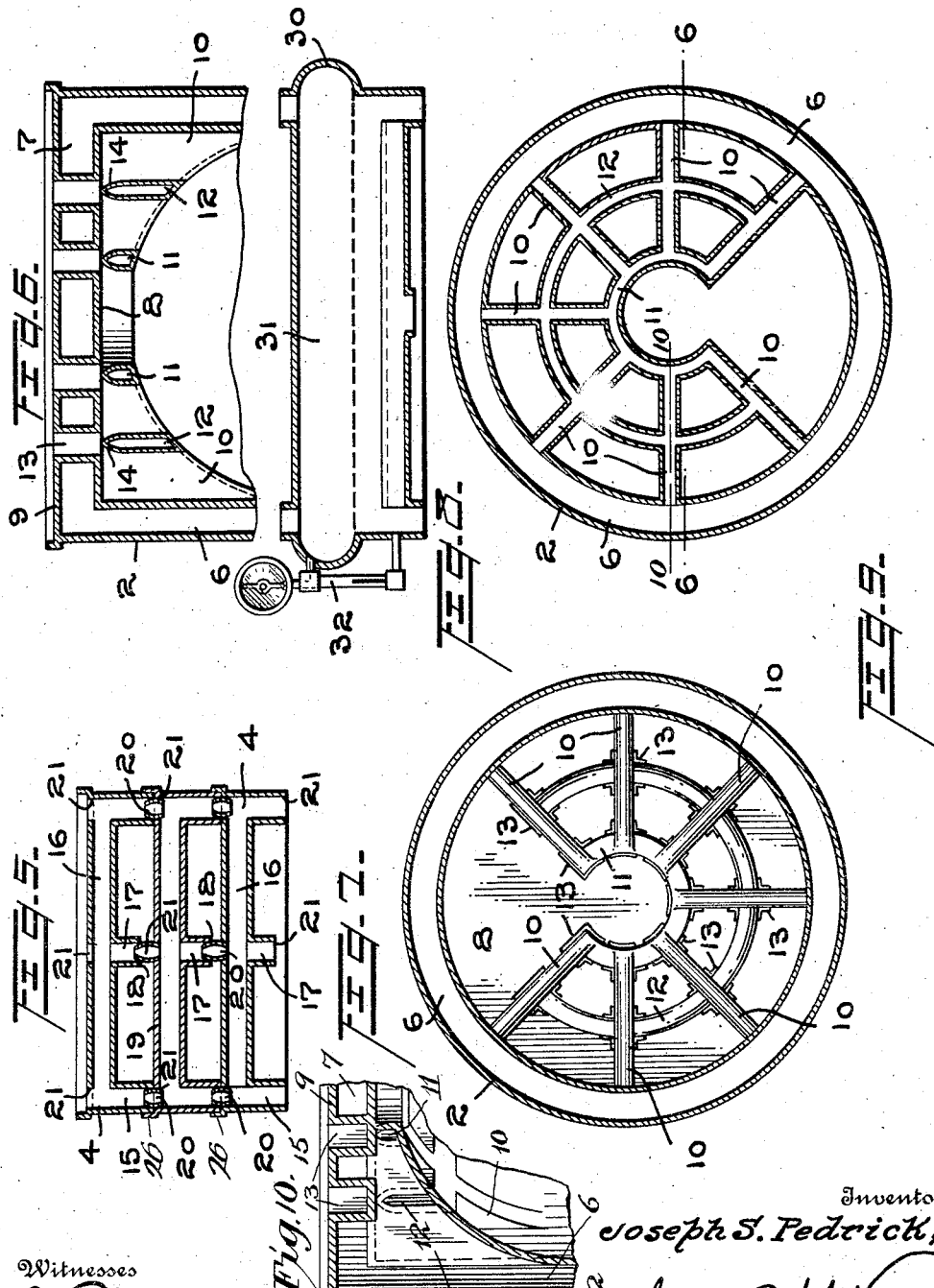

JOSEPH S. PEDRICK, OF WESTMONT, NEW JERSEY.

WATER-HEATER.

1,173,304.   Specification of Letters Patent.   Patented Feb. 29, 1916.

Application filed March 29, 1915. Serial No. 17,837.

*To all whom it may concern:*

Be it known that I, JOSEPH S. PEDRICK, a citizen of the United States, residing at Westmont, in the county of Camden and State of New Jersey, have invented certain new and useful Improvements in Water-Heaters, of which the following is a specification.

My invention relates to improvements in water heaters, the object of the invention being to provide a water heater which will rapidly heat the water and utilize the maximum of heat units in the fuel.

A further object is to provide a water heater which facilitates the circulation of water, exposing the same to heat radiation from hottest metal surfaces, and economizing fuel as well as rapidly heating the water.

A further object is to provide an improved fire pot section having an annular water space and a top water space, communicating with the annular space, said water spaces connected by radial and concentric water containing ribs communicating with both of said spaces, and with each other, whereby water is compelled to circulate through the ribs and receive the direct heat of the fuel in the upper portion of the fire pot.

A further object is to provide an improved construction of top and intermediate sections, located above the fire pot section, whereby the water in the sections are subjected to the heat of the products of combustion in its circuitous path through the heater.

With these and other objects in view, the invention consists in certain novel features of construction and combinations and arrangements of parts as will be more fully hereinafter described and pointed out in the claims.

In the accompanying drawings: Figure 1 is a view in front elevation illustrating my improved water heater. Fig. 2 is a view in vertical section on the line 2—2 of Fig. 1. Fig. 3 is a view in transverse section on the line 3—3 of Fig. 2. Fig. 4 is a view in transverse section on the line 4—4 of Fig. 2. Fig. 5 is a view in vertical section through the center of the intermediate water heater sections, the view being taken at right angles to Fig. 2. Fig. 6 is a fragmentary view in vertical section on an enlarged scale taken on the line 6—6 of Fig. 9. Fig. 7 is an inverted sectional plan view taken on the line 7—7 of Fig. 2. Fig. 8 is a view in vertical section illustrating a form of top section which is used when the heater is designed for steam instead of hot water. Fig. 9 is a view in horizontal section on the line 9—9 of Fig. 2, and Fig. 10 is a section on the line 10—10 of Fig. 9.

My improved water heater is made up of a plurality of sections, namely, a base section 1, a fire pot section 2, a top section 3, and intermediate sections 4, as many of said intermediate sections being provided as desired, and said intermediate sections clamped between the top section 3 and the fire pot section 2 by means of bolts 5 as is customary with heaters of this character. The base section 1 constitutes an ordinary ash pit, and supports fire pot section 2, which latter is formed with an annular water space 6 communicating with a top water space 7 formed between a crown sheet 8 and a top sheet 9. In the top of the fire pot 2, I provide a circular series of radially positioned water containing ribs 10. These ribs, throughout their upper portions, communicate with the water space 7, and throughout their outer end portions communicate with the annular water space 6. The ribs are deepest or longest at their outer ends, and gradually decrease in depth to their inner ends, the inner ends of all of the ribs communicating with a curved hollow water rib 11. The ribs 10 are connected at a point between their inner and outer ends by a second curved hollow water rib 12. Smoke flues 13 are provided in the top of the fire pot extending through the water space 7, and forming openings in top sheet 9 and crown sheet 8. Through these flues 13, the smoke and gases from the fuel escape, and these flues are so arranged that they are located above the juncture points of the ribs 10, 11, and 12. The ribs 10 and 11 extend across the lower ends of the flues 13, and at such points are arched as shown at 14, so that they do not prevent the passage of the smoke and gases. At other points the ribs 11 and 12 communicate directly with the upper water space 7. As seen particularly in Fig. 4, the flues 13 are of peculiar shape in cross section in order to provide ample area for the passage of the smoke and gases, and these flues may be made of any shape and of any size in accordance with the desire of the trade to give the necessary draft.

While I have described the several parts of the fire pot as independent elements, it is to be understood that all parts thereof will be cast integrally, so that the fire pot section will constitute but one single casting.

The intermediate sections 4 are each precisely like the others with the exception that the alternate sections are reversely positioned, and hence the description hereinafter of one intermediate section 4 will apply alike to all. Each section 4 is made with an annular water space 15, communicating with a top water space 16. Each section 4 is provided diametrically with a hollow depending rib 17, the rib shorter than the annular water space 15, so that its bottom 18 is located above the top 19 of the section 4 below, so that the smoke and gases can freely pass under the rib 17. To connect the several sections 4, I provide what is known in the trade as "push nipples" 20, and locate such push nipples in openings 21 at the sides of the sections connecting the water space 15 of one section with the water space 15 of the adjacent section, and I also connect the rib 17 of the upper section with the water space 16 of the section below, locating the nipple 20 at the center of the rib as clearly shown in Fig. 5. This means of communication insures a proper circulation of the water upwardly through all of the nipples, through the annular spaces, and in addition through the ribs 17. Each section 4 is provided at opposite sides of its rib 17 with flues 22, and the flues of one section are located out of alinement with the flues of the other sections as clearly shown in Fig. 2 to compel the smoke and gases to travel through a relatively long circuitous path, and utilize the heat of the fuel to the maximum degree.

The top section 3 is like the intermediate section 4 in respect to the arrangement of water spaces and ribs, and hence I have given these parts of the top section the same reference numerals as applied to the intermediate sections. The top section is, however, provided with outlet pipes 23 for directing the water to the system, and is also provided with a smoke flue 24 having a damper door 25 therein.

Each section 4 as well as the fire pot section 2, is provided with an annular flange 26 into which the section above snugly fits, and each upper section is provided with a clean out door 27, while the ash pit section is provided with the ordinary fuel door 28, and a combined ash and draft door 29 is located in the base section 1.

I have described my improvements in connection with a water heater, but where my improvements are to be used for steam, I shall substitute for the top section 3 shown in Fig. 2, a top section 30 such as shown in Fig. 8. This top section 30 is provided with a steam space 31 in its upper portion, and in its lower portion has an annular water space 15 connected by a rib 17 like the form first described, and the section 30 will be equipped with such ordinary auxiliaries as are used for steam boilers, and I have shown an ordinary gage 32 connected with the section. My invention is, however, not limited to the particular details shown, as I may vary them in many ways.

With my improved water heater, the water receives in the fire pot section 2, and particularly in the ribs 10, 11, and 12, as well as in the top water space 7, the direct heat from the fire. As this is the hottest part of the heater, the water in relatively shallow compartments, is subjected to the extreme heat, and rapidly rises in temperature, flowing quickly to the upper sections, and making room for colder water from below.

As the return pipes 33 communicate with the lower portion of the annular water space 6, the cold water will always be returned to the fire pot section, and the rapid heating of the water in the top of the fire pot section insures a rapid circulation which is one of the vital essential considerations in a water heating system. Furthermore, the arrangement of flues and construction of sections compels the smoke and gases to contact with a maximum of radiating surface, and impart the heat to the water.

My improved construction is especially adapted to withstand strains due to contraction and expansion caused by changes in temperature, as the several radial and concentric ribs provide hollow spaces made up of a number of walls which can move relative to each other without cracking or breaking the casting, and hence I not only utilize the maximum of heat, but I also prevent injuries which occur due to such expansion and contraction.

While I have described and shown what I believe to be a preferred embodiment of my invention, I would have it understood that I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a water heater, the combination with a fire pot section having communicating annular and top water spaces, with flues extending through the latter, of a concentric depending water rib traversing said flues and said rib being in open communication with the top water space except where traversing said flues, substantially as described.

2. In a water heater, the combination with a fire pot section having communicating annular and top water spaces, of a plurality of concentric water containing depending ribs in open communication with the top water space, and radial ribs connecting both of said first-mentioned ribs and communicating with both of said first-mentioned water spaces, substantially as described.

3. In a water heater, the combination with a fire pot section having an annular water space and a top water space, with flues through the latter, of a series of radially positioned water containing ribs, communicating with both of said water spaces, and other water containing ribs connecting the first-mentioned ribs, said last-mentioned ribs extending across the flues, substantially as described.

4. In a water heater, the combination with a fire pot section having an annular water space and a top water space, with flues through the latter, of a series of radially positioned water containing ribs, communicating with both of said water spaces, and other water containing ribs connecting the first-mentioned ribs, said last-mentioned ribs curved concentrically, substantially as described.

5. In a water heater, the combination with a fire pot section having an annular water space and a top water space, with flues through the latter, of a series of radially positioned water containing ribs, communicating with both of said water spaces, and other water containing ribs connecting the first-mentioned ribs, said last-mentioned ribs curved concentrically and extending across the flues, substantially as described.

6. In a water heater, the combination with a fire pot section having an annular water space and a top water space with flues through the latter of a series of radially positioned water containing ribs communicating with both of said water spaces, and other water containing ribs connecting the first-mentioned ribs, said last-mentioned ribs extending across the flues and having their upper walls arched below the flues, whereby the products of combustion pass around the last-mentioned ribs into the flues, substantially as described.

7. In a water heater, the combination with a fire pot having an annular water space and a top water space, of a curved water containing rib integral with the crown sheet of the fire pot and communicating with the top water space, and a series of radially positioned water containing ribs communicating with the first-mentioned rib and with both of said water spaces, substantially as described.

8. In a water heater, the combination with a fire pot having an annular water space and a top water space, of a curved water containing rib integral with the crown sheet of the fire pot and communicating with the top water space, and a series of radially positioned water containing ribs communicating with the first-mentioned rib and with both of said water spaces, and a second curved rib concentric with the first-mentioned curved rib, and communicating with all of the radial ribs and with the top water space, substantially as described.

9. In a water heater, the combination with a fire pot having an annular water space and a top water space, of a curved water containing rib integral with the crown sheet of the fire pot and communicating with the top water space, a series of radially positioned water containing ribs communicating with the first-mentioned rib and with both of said water spaces, said fire pot having flues extending through the top water space, said flues located in line with the juncture points of the curved and the radial ribs, substantially as described.

10. In a water heater, the combination with a fire pot having an annular water space and a top water space, of a curved water containing rib integral with the crown sheet of the fire pot and communicating with the top water space, and a series of radially positioned water containing ribs communicating with the first-mentioned rib and with both of said water spaces, a second curved rib concentric with the first-mentioned curved rib and communicating with all of the radial ribs and with the top water space, said fire pot having flues extending through the top water space, said flues located in line with the juncture points of the curved and the radial ribs, substantially as described.

11. In a water heater, the combination with a fire pot section, a top section, and intermediate sections between the top section and the fire pot section, all of said sections having annular and top water spaces, each of said intermediate and top sections having transversely positioned water ribs connecting the top spaces therein with the annular spaces, and having the lower edges of the ribs located above the tops of the sections below, and means connecting the water spaces in all of the sections, substantially as described.

12. In a water heater, the combination with a fire pot section, a top section, and intermediate sections between the top section and the fire pot section, all of said sections having annular and top water spaces, each of said intermediate and top sections having transversely positioned water ribs connecting the top spaces therein with the annular spaces, and having the lower edges of the ribs located above the tops of the sections below, means connecting the annular spaces of all of the sections, and means connecting the central portions of the ribs of the upper sections with the top water spaces of the sections below, substantially as described.

13. In a water heater, the combination with a fire pot section, a top section, and intermediate sections between the top section and the fire pot section, all of said sections having annular and top water spaces, each of said intermediate and top sections having transversely positioned water ribs connecting the top spaces therein with the annular spaces, and having the lower edges of the ribs located above the tops of the sections below, means connecting the water spaces in all of the sections, said intermediate sections having flues therethrough located at opposite sides of the ribs, the flues of one section located oppositely to the flues of the adjacent section, substantially as described.

14. In a water heater, the combination with a fire pot section, a top section, and intermediate sections between the top section and the fire pot section, all of said sections having annular and top water spaces, each of said intermediate and top sections having transversely positioned water ribs connecting the top spaces therein with the annular spaces, and having the lower edges of the ribs located above the tops of the sections below, means connecting the annular spaces of all of the sections, means connecting the central portions of the ribs of the upper sections with the top water spaces of the sections below, said intermediate sections having flues therethrough located at opposite sides of the ribs, the flues of one section located oppositely to the flues of the adjacent section, substantially as described.

15. In a water heater, the combination with a fire pot section, a top section, and intermediate sections between the top section and the fire pot section, all of said sections having annular and top water spaces, each of said intermediate and top sections having transversely positioned water ribs connecting the top spaces therein with the annular spaces, and having the lower edges of the ribs located above the tops of the sections below, and push nipples connecting opposite sides of the annular water spaces of the respective sections, and other push nipples connecting the central portions of the ribs of the upper section with the top water spaces of the sections below, substantially as described.

In testimony whereof I have signed my name to this specification in the presence of two subscribing witnesses.

JOSEPH S. PEDRICK.

Witnesses:
  MARIE JACKSON,
  CHAS. E. POTTS.